United States Patent
Bardhan et al.

(10) Patent No.: US 7,384,442 B2
(45) Date of Patent: Jun. 10, 2008

(54) CERAMIC WALL-FLOW FILTER INCLUDING HEAT ABSORBING ELEMENTS AND METHODS OF MANUFACTURING SAME

(75) Inventors: Pronob Bardhan, Corning, NY (US); Douglas Munroe Beall, Painted Post, NY (US); Kenneth Richard Miller, Addison, NY (US); John Forrest Wight, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 429 days.

(21) Appl. No.: 11/068,950

(22) Filed: Feb. 28, 2005

(65) Prior Publication Data

US 2006/0191248 A1    Aug. 31, 2006

(51) Int. Cl.
   *B01D 46/00* (2006.01)
   *F01N 3/022* (2006.01)

(52) U.S. Cl. .................. 55/523; 55/282.3; 55/385.3; 55/524; 55/DIG. 5; 55/DIG. 10; 55/DIG. 30; 60/311; 95/273; 428/116; 428/117; 264/628; 264/630; 264/DIG. 48

(58) Field of Classification Search ............... 55/282.2, 55/282.3, 385.3, 523, 524, 254, DIG. 5, DIG. 10, 55/DIG. 30; 60/311; 428/116, 117; 264/628, 264/630, 631, DIG. 48; 95/273
See application file for complete search history.

(56) References Cited

U.S. PATENT DOCUMENTS

| | | | |
|---|---|---|---|
| 3,983,283 A | 9/1976 | Bagley | |
| 4,329,162 A | 5/1982 | Pitcher, Jr. | |
| 4,363,644 A * | 12/1982 | Sato et al. | 55/523 |
| 4,404,007 A * | 9/1983 | Tukao et al. | 55/523 |
| 4,448,833 A | 5/1984 | Yamaguchi et al. | |
| 4,519,820 A * | 5/1985 | Oyobe et al. | 55/523 |
| 4,521,532 A | 6/1985 | Cho | |
| 4,559,193 A * | 12/1985 | Ogawa et al. | 55/523 |
| 4,740,408 A | 4/1988 | Mochida et al. | 428/116 |

(Continued)

FOREIGN PATENT DOCUMENTS

JP    3-284312    * 12/1991

(Continued)

OTHER PUBLICATIONS

JP 01-304022, Jul. 12, 1989, "Honeycomb-Shape Filter", Patent Abstracts of Japan.

*Primary Examiner*—Jason M Greene
(74) *Attorney, Agent, or Firm*—Joseph M. Homa; Randall S. Wayland (57) ABSTRACT

A ceramic wall-flow filter for filtering particulate matter from gases and methods for manufacturing such wall-flow filters are disclosed. The filter includes an array of porous ceramic walls defining a pattern of end-plugged inlet and outlet cells, and heat absorbing elements disposed within at least some of the outlet cells such that a bulk heat capacity of the outlet cells is greater than a bulk capacity of the inlet cells. The heat absorbing elements increase a bulk heat capacity of the filter without substantially interfering with a flow of gas through the porous ceramic walls by allowing thinner walls. According to the method, during the step of extruding or thereafter, heat absorbing elements are formed within at least some of the outlet cells such that a heat capacity of the outlet cells is greater than the inlet cells.

18 Claims, 9 Drawing Sheets

U.S. PATENT DOCUMENTS

| | | | |
|---|---|---|---|
| 4,857,089 A | 8/1989 | Kitagawa et al. | 55/523 |
| 4,902,216 A | 2/1990 | Cunningham et al. | |
| 5,260,035 A * | 11/1993 | Lachman et al. | 55/523 |
| 6,840,976 B2 | 1/2005 | Vance et al. | 55/523 |
| 7,090,714 B2 * | 8/2006 | Otsubo et al. | 55/523 |
| 2004/0071931 A1 | 4/2004 | Kai et al. | 428/116 |
| 2004/0191133 A1 | 9/2004 | Yamaguchi | 422/180 |

FOREIGN PATENT DOCUMENTS

| | | | |
|---|---|---|---|
| JP | 2003-56327 | * | 2/2003 |
| WO | 2006/024792 | | 3/2006 |

* cited by examiner

CERAMIC WALL-FLOW FILTER INCLUDING HEAT ABSORBING ELEMENTS AND METHODS OF MANUFACTURING SAME

BACKGROUND OF THE INVENTION

1. Field of the Invention

The present invention is directed to a filter having a multi-cellular structure. In particular, the present invention is directed to a wall-flow filter for trapping diesel exhaust particulates and methods for manufacturing such filters.

2. Technical Background

Wall-flow filters are used in the purification of diesel exhaust. Typically, such diesel particulate filters are made of cordierite or silicon carbide and include a honeycomb body having thin interconnecting porous walls which are arranged and configured to form parallel cells longitudinally extending between the end faces of the structure. Alternating cells on one end face of the honeycomb are plugged with a ceramic filler material to form a "checkerboard" pattern. The pattern is reversed on the opposite side so that the ends of each cell are blocked at only one end of the structure. When diesel exhaust gas enters the filter through one end face (i.e., inlet end), it is forced to pass through the thin porous walls and exits through the opposite end face (i.e., outlet end) thereby filtering particulates carried in the exhaust gas.

Various filters having honeycomb structures are known in the art. U.S. Pat. Nos. 4,329,162; 4,415,344; 4,416,676; 4,417,908; and 4,420,316 discuss cordierite wall-flow diesel particulate filter designs. U.S. Pat. No. 5,914,187 discusses silicon carbide wall-flow diesel particulate filters. U.S. Pat. No. 6,696,132 and U.S. Pat. No. 6,843,822 disclose honeycomb structures for a filter in which the cells have non-equal cross sections, the larger cross section of the inlets allowing increased capacity for storing carbonaceous soot and ash particulates.

The application of such a filter in the exhaust gas stream causes a pressure drop in the gas that is filtered therethrough. Thus, presence of the filter results in a fuel penalty since additional work must be done by the engine to push the exhaust gas through the filter. Since it is desirable to minimize such parasitic losses, filter designs having low pressure drop are preferred. The pressure drop may be minimized by making the ceramic walls of the filter thin. A disadvantage with this approach is that, for a given soot loading level, a regeneration event will result in higher maximum temperatures for a filter with thin walls. This can result in damage to the filter, including catalyst deactivation, or cracking, or even melting of the filter.

In particular, as the exhaust passes through the filter, particulate matter (i.e., carbon soot and ashes) accumulates on the wall of the cells or in the pores of the wall and forms a soot layer. These particulates decrease the effective diameter of the cells and further contribute to the pressure drop across the filter, thereby increasing the back pressure that acts against the engine exhaust. The carbon soot can be burned off during a regeneration process in which the filter is heated sufficiently to initiate combustion of the carbon soot layer. Normally, during regeneration, the temperature in the filter rises from about 400-600° C. to a maximum of about 800-1000° C. Under certain circumstances, a so-called "uncontrolled regeneration" can occur when the onset of combustion coincides with, or is immediately followed by, high oxygen content and low flow rates in the exhaust gas. During an uncontrolled regeneration, the combustion of the soot may produce temperature spikes within the filter which can thermally shock and crack, or even melt, the filter.

Thus, the filters must be sufficiently durable to withstand such high temperatures experienced during regeneration. Correspondingly, whereas reduction in the wall thickness of the cells can reduce back pressure, this solution is not optimal in view of the fact that the durability is reduced as a result. Further, whereas increased wall thickness of the cells is desirable to increase the durability of the filter, such increased wall thickness also undesirably increases the back-pressure.

In view of the above, there exists an unfulfilled need for a ceramic wall-flow filter that has thin filtration wall so as to minimize the pressure drop, but that has the durability to avoid potential damage during regeneration processes.

SUMMARY OF THE INVENTION

In view of the foregoing, one advantage of the present invention is that it may provide a ceramic wall-flow filter that has thinner filtration walls as compared to the prior art so as to minimize the pressure drop across the filter. Another advantage of the present invention is that it may provide a ceramic wall-flow filter that has high bulk heat capacity to minimize high temperatures and potential damage during regeneration processes. In particular, thin walls may be achieved while at the same time providing sufficiently high bulk heat capacity to minimize high temperatures and potential damage during regeneration.

These and other advantages are attained by a ceramic wall-flow filter having utility for filtering particulate matter from gases in accordance with the present invention. According to embodiments of the invention, the ceramic wall-flow filter includes a filter body having an array of porous ceramic walls defining a pattern of inlet and outlet cells traversing the body and extending between an inlet end and an outlet end, the inlet cells including first plugs at the outlet end, and the outlet cells including second plugs at the inlet end, and heat absorbing elements disposed within at least some of said outlet cells such that a bulk heat capacity of the elements in the outlet cells is greater than a bulk heat capacity of the elements in inlet cells, if any are provided in such inlet cells. Most preferably, heat absorbing elements are provided only in the outlet cells. The presence of the heat absorbing elements increases a bulk heat capacity of the filter without substantially interfering with a flow of gas through the porous ceramic walls. In particular, according to one advantage, the wall thickness may be made smaller as compared to prior art structures while the addition of the elements maintains at least an equivalent level of bulk heat capacity. Optionally, of course, the wall thickness may be made the same with an increase in bulk heat capacity as compared to the prior art.

In accordance with one embodiment, the elements disposed within the cells are a porous ceramic foam material. In this regard, the ceramic forming the foam may be the same ceramic material that forms the porous ceramic walls. The ceramic foam may be applied, for example, to coat the inner surfaces of the outlet cells and/or to fill the interior of the outlet cells. Alternatively or additionally, the ceramic foam may be applied to coat the inner surfaces of at least some of the inlet cells. However, if done, such coating must be applied to a lesser extent than in the outlet cells thereby resulting in higher bulk heat capacity in the outlet cells than inlet cells while retaining suitable soot and ash storage capacity. Most preferably, the permeability of the ceramic foam material is higher than the permeability of the ceramic material forming the walls, and may be implemented as a cellular structured foam, such as an open cell foam. The foam may be attached to the inner surfaces of the cell walls, for example, by fusion. Alternatively, the heat absorbing, gas conductive elements may comprise loose material and be unattached to the inner surfaces of the cells. Additional plugs may be employed to retain the loose material in the cells.

In still another embodiment, the heat absorbing elements disposed within at least some of the outlet cells may be implemented as webs of ceramic material. In this regard, the webs may be implemented to extend completely across the outlet cells, for example, or be integrally connected to the inner surface of the outlet cell. The ceramic wall-flow filter may be implemented such that the interior of the outlet cells have a square cross section, and the web connects across two corners of the interior in a diagonal configuration. Alternatively, two webs may be connected across different opposing corners of the interior in an x-shaped configuration. In yet another embodiment, two webs may be implemented to connected opposing midpoints of the walls in a cross-shaped configuration. Alternatively, the thickness of the webs may be different from the thickness of the porous walls defining the inlet and outlet cells.

According to yet a further aspect of the invention, a method of manufacturing a ceramic wall flow filter is provided comprising the steps of forming ceramic material, preferably by extrusion, into a filter body having an array of porous ceramic walls defining a pattern of inlet and outlet cells traversing the body and extending between an inlet end and an outlet end, plugging the inlet cells with first plugs at the outlet end, plugging the outlet cells with second plugs at the inlet end, and during the step of extruding or thereafter, forming heat absorbing elements within at least some of the outlet cells such that a bulk heat capacity of the outlet cells is greater than a bulk heat capacity of the inlet cells. Preferably, the heat absorbing elements are only formed in the outlet cells.

These and other advantages and features of the present invention will become more apparent from the following detailed description of the preferred embodiments of the present invention when viewed in conjunction with the accompanying drawings. Where appropriate, identical features have been identically numbered.

DETAILED DESCRIPTION OF THE INVENTION

Figure 1A:
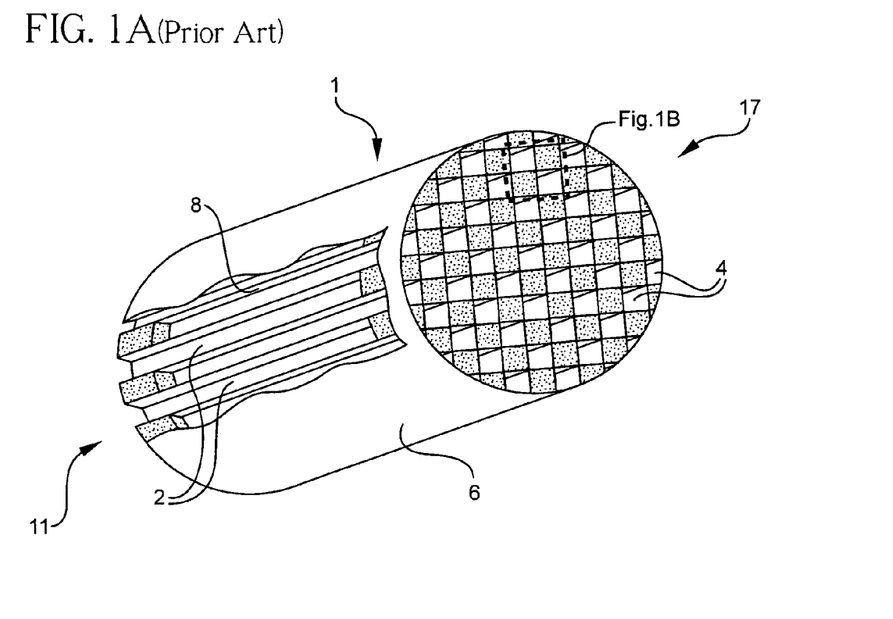
FIG. 1A is a partially sectioned isometric illustration of a prior art filter having an end-plugged honeycomb structure with inlet and outlet cells as viewed from the outlet end.
Figure 1B:
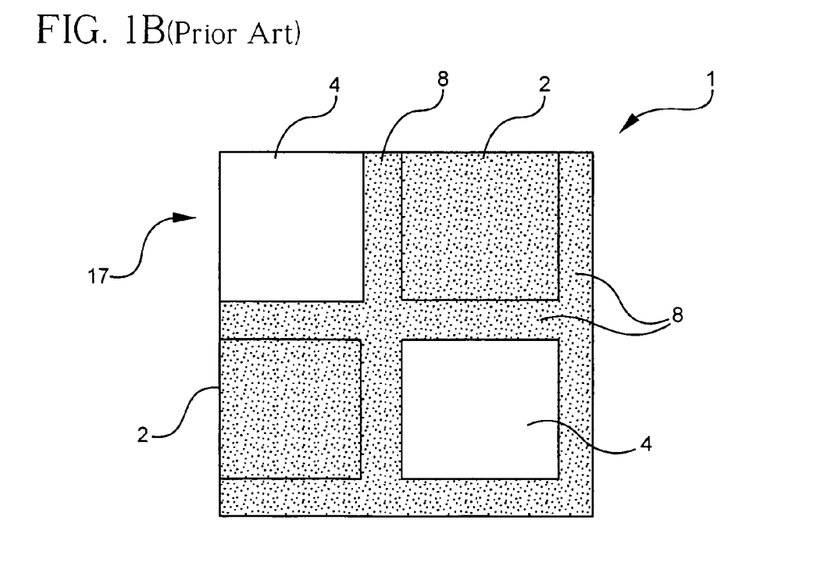
FIG. 1B is an enlarged outlet end view of a portion of the prior art honeycomb structure for the filter of FIG. 1A.

FIG. 1A illustrates a partially-sectioned isometric view of a prior art ceramic wall-flow filter 1, and FIG. 1B shows an enlarged outlet end partial view of the prior art honeycomb structure for the filter 1. As illustrated in FIGS. 1A, 1B, the conventional filter 1 has an end-plugged honeycomb structure with inlet cells 2 which are plugged in the views shown on the outlet end 17, and outlet cells 4 that are open at the outlet end. The plurality of cells extend between an inlet 11 and an outlet 17 ends of the filter 1 and have generally square cross-sections formed by interior porous walls 8 that run substantially longitudinally between the inlet 11 and outlet 17 ends of the filter 1. The cells 2, 4 are arranged to alternate between inlet cells 2 and outlet cells 4, and plugged in an alternating manner for each end, resulting in a checkered pattern of alternating cells. Therefore, inlet cells 2 are bordered on all sides by outlet cells 4, and vice versa (of course except adjacent the skin 6). As should be recognized, the drawings may not be shown to scale.

Figure 2:
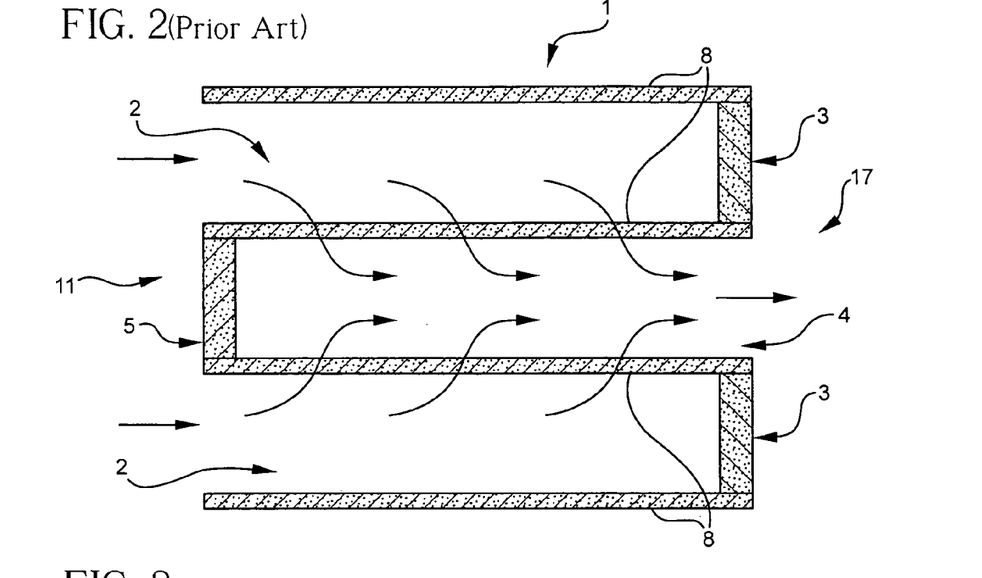
FIG. 2 is a schematic side partial cross-sectional view of the prior art filter of FIG. 1B that illustrates the flow of the exhaust gas through the filter.

FIG. 2 is a schematic side cross-sectional view of the prior art filter 1 of FIGS. 1A and 1B that illustrates the flow of the exhaust gas through the interior of the filter 1. As shown, the exhaust gas enters the filter 1 through the inlet cells 2 which are plugged at the outlet end 17 by plugs 3. The exhaust gas is forced through the ceramic walls 8 which are porous and permeable, and exits at the outlet end 17 through the outlet cell 4 which is plugged at the inlet end 11 by plug 5. As the exhaust gas is forced through the ceramic walls 8, the particulates in the exhaust gas are at least partially removed by the ceramic walls 8, thereby filtering the exhaust gas.

Figure 3:
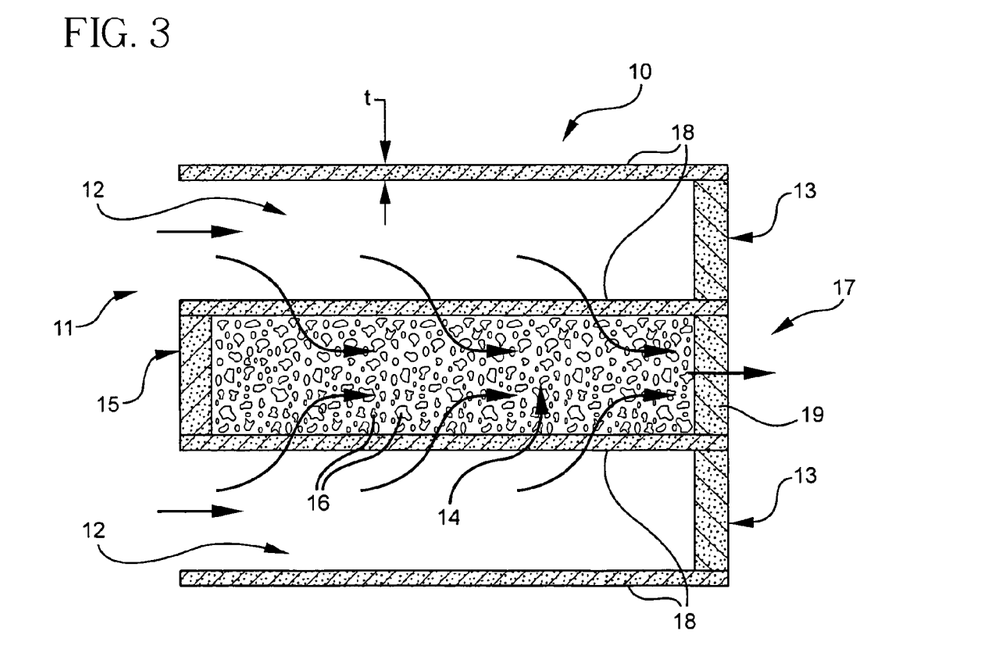
FIG. 3 is a schematic side partial cross-sectional view of a filter in accordance with one embodiment of the present invention having a honeycomb structure in which the heat absorbing elements are disposed within the outlet cells.

FIG. 3 illustrates a side cross-sectional partial view of a ceramic wall-flow filter 10 in accordance with one embodiment of the present invention. This embodiment has thin filtration walls (as compared to the prior art filter) so as to minimize the pressure drop of the exhaust gas, but has bulk heat capacity (equal to or greater than the prior art filter) to avoid high temperatures and potential damage during regeneration processes. The ceramic wall-flow filter 10 has a preferable honeycomb structure with inlet cells 12 that are open to an inlet end 11, and outlet cells 14 (only one shown for clarity) open to the outlet end 17. The term "cell" as used herein means a single void extending in the ceramic body, surrounded by and whose extent is defined and circumscribed by the porous walls. The cell, as defined herein, does not include any portion of the walls and cells radial extent is circumscribed by the wall's inner surfaces. Each cell has a cross-sectional shape that preferably extends along substantially the entire length of the filter (except for the portion plugged with plug 3, 5). Thus, the cell's volume is defined by an internal space, bounded by inner surfaces of the walls, and extending along the entire length of the body from the inside surface of the plug to the opposite end of the body. Each of the inlet cells 12 preferably has substantially the same transverse shape, size, and cross-sectional area. Likewise, each of the outlet cells 14 preferably also has substantially the same transverse shape, size, and cross-sectional area. In this regard, the ceramic wall-flow filter 10 includes an array of preferably parallel, porous ceramic walls 18, which in the illustrated embodiment, has substantially equal transverse thicknesses, t, along its length and are permeable by the exhaust gas, but have sufficiently small interconnected open porosity to efficiently trap particulates suspended in the exhaust gas. The walls preferably do not include any discontinuities therein. The ceramic walls 18 define the preferably alternating pattern of inlet cells 12 and the outlet cells 14 and their respective gas conducting interiors. Preferably, the number of inlet cells is substantially equal to the number of outlet cells. Inlet cells may include non-equal areas, preferably larger, as compared to the inlet cells.

For diesel particulate filters, honeycomb structures having cellular densities about 10 to 300 cells/in$^2$ (0.465 cells/mm$^2$), more typically about 100 to 300 cells/in$^2$ (0.155 to 0.465 cells/mm$^2$), are considered useful to provide sufficient thin wall surface area. Wall thickness can vary upwards from the minimum dimension providing structural integrity of about 0.002 inch (0.051 mm), but are generally less than about 0.060 inch (1.52 mm) to minimize filter back pressure. Preferred wall thickness are between about 0.010 to 0.030 inches (0.254 to 0.762 mm); more preferably between 0.008 to 0.025 inches (0.203 to 0.635 mm) being most preferable for these materials at the preferred cellular densities. Interconnected open porosity of the thin porous walls may vary, but is generally greater than about 25% of wall's volume, and usually greater than about 35% to allow fluid flow through the thin wall. Diesel filter integrity becomes questionable above about 70% open pore volume. Volumes of about 40-60% are therefore most typical. For diesel particulate filtration, it is believed that the open porosity may be provided by pores in the cell walls having median diameters in the range of about 1 to 60 microns; with preferred range of about 10 to 50 microns. Volumetric porosity and median pore size are typically specified as determined by conventional mercury-intrusion porosimetry.

As shown in FIG. 3, in operation, the exhaust gas enters the filter 10 through the inlet cells 12 which are plugged at the outlet end 17 by plugs 13, is forced through the permeable ceramic walls 18, and exits through the outlet cells 14 (only one shown for clarity) which are plugged at the inlet end 11 by plugs 15. Thus, the particulates in the exhaust gas are efficiently removed by the ceramic walls 18 as the exhaust gas is forced through the ceramic walls 18.

The filter 10, in this embodiment, is further provided with heat absorbing, preferably gas conductive/permeable elements 16 that are disposed within at least some, and preferably all, of the outlet cells 14. The heat absorbing elements 16 effectively increase the bulk heat capacity of the filter 10 as compared to a filter without such elements disposed in the cells. In particular, the addition of elements in the outlet cells allows the design to utilize thinner porous walls while providing bulk heat capacity equal to or increased relative to a former prior art filter. Accordingly, thinner walls can be implemented which generally have better flow of gas through the porous ceramic walls 18. Correspondingly, the thermal shock resistance of the filter 10 is maintained or increased while minimizing the pressure drop across the filter 10. Of course, it should be recognized that slightly thicker walls may be desired where more thermal shock resistance/over temperature protection is required, and slight thinner walls may be employed where lesser thermal mass is needed, but where low back pressure is more important.

The present invention is especially suited for use as diesel particulate filters where regeneration of the filter 10 by burning of the carbon soot is required. In this regard, the end-plugged honeycomb structure of filter 10 may be formed of any appropriate material. For example, cordierite, aluminum titanate, silicon carbide or other porous, but thermally durable, ceramic material may be used. In addition, the elements 16 disposed within the outlet cells 14 may be a porous ceramic foam material. The ceramic foam material of the elements 16 itself, may be made from the same ceramic material forming the porous ceramic walls 18, or alternatively, be made of a different ceramic material. Most preferably, the material of the elements 16 has a higher heat capacity (mass times specific heat of the material) than the wall material.

The permeability of the ceramic foam material used in the implementation of the elements 16 is preferably higher than the permeability of the ceramic material forming the walls 18 so that the elements 16 do not substantially interfere with the flow of gas through the ceramic walls 18. Preferably, the ceramic foam includes internal interconnected open porosity. In this regard, the ceramic foam material may be implemented with a cellular structured foam with higher gas permeability than the gas permeability of the ceramic material forming the walls 18.

In the illustrated implementation of the present invention shown in FIG. 3, the heat absorbing elements 16 are not directly attached to the inner surfaces of the outlet cell 14, i.e. the ceramic walls 18, but merely fill the interior of at least some, and preferably all, of the outlet cells 14. The elements are preferably, however, in thermal contact with the walls 18. The elements preferably extend along the outlet cells 14 from the plugs 15 to the outlet end 17 and preferably substantially fill the outlet cells 14 including such elements. Of course, in other implementations, the heat absorbing elements 16 may be directly attached to the inner surfaces of the outlet cell 14, for example, by fusion or bonding.

To the extent that the material forming the elements 16 is a ceramic powder, particulate, or fibrous material, an additional permeable plug may be employed to retain the material within the outlet cells 14, such as plug 19. Plug 19 is preferably sufficiently porous to minimize any back pressure penalty. In some embodiments, the material of the elements 16 substantially fills the outlet cells 14 along their entire longitudinal length (except for any inherent porosity). In the case where the disposed elements comprise a fill material, it is preferably poured, flowed, or otherwise inserted into the outlet cells.

As should be recognized, the elements may be included in some or all of the outlet cells 14, some or all of the inlet cells 12, or some or all of both. Preferably, however, the elements 16 are only included in some or all of the outlet cells 14 and are not included in the inlet cells 12. This construction provides increases in bulk heat capacity of the filter 10 without appreciably affecting its soot storage capacity. To the extent the elements 16 are provided in the inlet cells 12, they are preferably provided to a lesser extent than in the outlet cells 14. The term "to a lesser extent" means that the bulk heat capacity ($\Sigma M_i C_i$) of all the elements disposed in the inlet cells is less than the bulk heat capacity ($\Sigma M_o C_o$) of all the elements provided in the outlet cells. In other words, the following equation is followed:

$$\Sigma M_i C_i < \Sigma M_o C_o \qquad (1)$$

and more preferably:

$$\Sigma M_i C_i << \Sigma M_o C_o \qquad (2)$$

where $M_i$ is the mass of the elements disposed in the inlet cells,
$M_o$ is the mass of the elements disposed in the outlet cells,
$C_i$ is the specific heat of the elements disposed in the inlet cells, and
$C_o$ is the specific heat of the elements disposed in the outlet cells.

Figure 4:
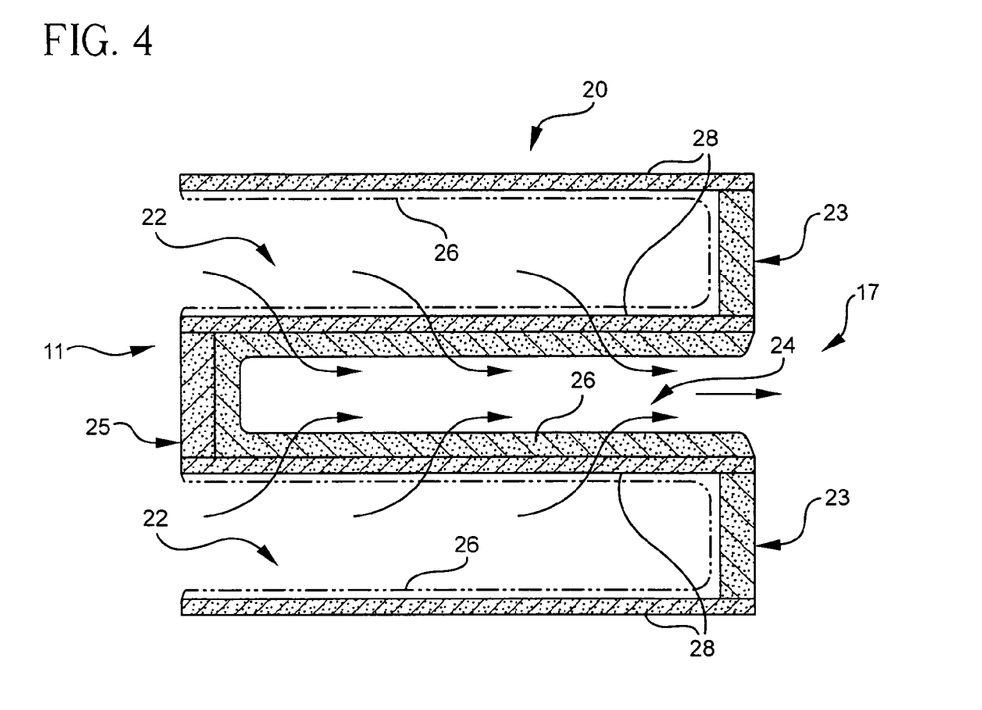
FIG. 4 is a schematic side partial cross-sectional view of a filter in accordance with another embodiment in which the heat absorbing elements are provided as a foam coating within the outlet cells.

FIG. 4 is a schematic side cross-sectional partial view of a ceramic wall-flow filter 20 having a honeycomb structure that is similar to the structure shown in filter 10 of FIG. 3 discussed above. In this regard, the filter 20 has a honeycomb structure with inlet cells 22, and outlet cells 24 (only one shown for clarity), and an array of preferably parallel, porous ceramic walls 28 that efficiently filters the exhaust gas passing therethrough. The exhaust gas enters the filter 20 through the inlet cells 22 which are plugged by plugs 23 at the outlet end 17, is forced through the permeable ceramic walls 28, and exits through outlet cells 24 which are plugged by plugs 25 at the inlet end 11.

The filter 20 is further provided with heat absorbing, preferably gas conductive elements 26 that are disposed within the outlet cells 24. Optionally, the elements may be included in the inlet cells 22 also, but only to a lesser extent (as illustrated by dotted line illustrating a smaller thickness). In particular, the elements 26 are provided in the illustrated embodiment as a ceramic foam material coating some or all of the outlet cells 24. As discussed, the elements may also be included within both the outlet cells 24 and the inlet cells 22, but the thickness of the material is preferably less in the inlet cells such that the bulk heat capacity of the inlet cells is less. The coating layer of heat absorbing, preferably gas conductive elements 26 is provided and applied on the inner surfaces of the ceramic walls 28. The ceramic foam coating of elements 26 may be applied to the ceramic walls 28 in any appropriate manner, such as dipping, spraying or hydraulic injection. In the manner previous described, the ceramic heat absorbing elements 26 effectively increase the bulk heat capacity of the filter 20 without substantially interfering with the flow of gas through the porous ceramic walls 26. In particular, it should be recognized that the wall thickness is made thinner as compared to prior art structures without the elements 26. The elements are preferably added to the cells, most preferably to the outlet cells, to increase the bulk heat capacity thereof Thus, the thinner walls lower back pressure, while the coating elements 26 increase the back pressure again. Most preferably, the permeability (porosity) of the added ceramic foam elements 26 is greater than that of the walls 28 so to minimize back pressure increases. The coating elements, where used, preferably uniformly coat the entire length of the walls 28. Preferably, the coating elements 26 are of substantially constant thickness along their lengths.

In one alternate embodiment, the ceramic coating elements 26 are applied to some or all of the outlet cells 24 only, thereby adding heat capacity to the filter 20 while minimally impacting back pressure and soot trapping/storage capacity. Preferably, the coating material is a non-active material, in that it cannot modify the gaseous exhaust mixture (designated by arrows), by reaction with the mixture components, by catalytic activity, sorbing activity, or desorbing activity. The coating is sufficiently thick such that it increases the bulk heat capacity of the outlet cells.

Figure 5:
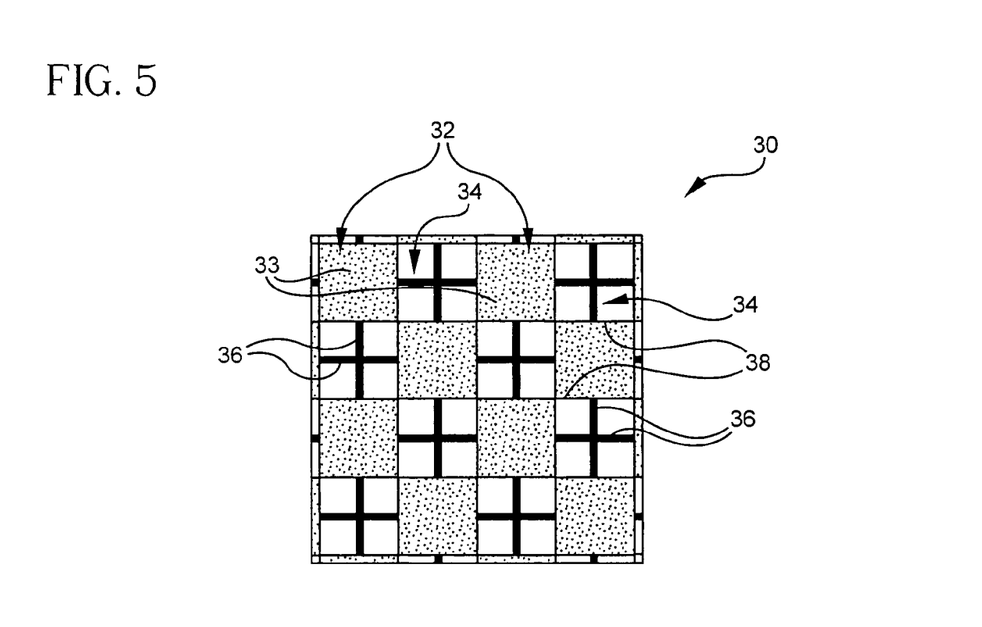
FIG. 5 is an outlet partial end view of a filter in accordance with another embodiment of the present invention having a honeycomb structure in which the heat absorbing elements are provided as cross-shaped webs of porous ceramic material in the outlet cells.

FIG. 5 is an outlet end partial view of a ceramic wall-flow filter 30 in accordance with another embodiment of the present invention where the heat absorbing, preferably gas conductive elements are implemented as a web. As shown, the filter 30 has a honeycomb structure with inlet cells 32, and outlet cells 34, the interiors of the cells being implemented to have a generally square cross section. The filter 30 also includes an array of preferably parallel, porous ceramic walls 38 that filters the exhaust gas passing therethrough as the exhaust gas passes into the outlet cells 34. It should be noted that the inlet cells 32 are plugged by plugs 33 in the illustration of FIG. 5. Plugs 33 may be manufactured and formed from a porous ceramic cement material such as described in U.S. Reissue Pat. No. Re 31,405, for example. However, any suitable plug material may be employed. Plugs 33 are preferably substantially shorter than the axial length of the cells which they plug.

The filter 30 is further provided with heat absorbing elements 36 that are preferably disposed within at least some, and preferably all, of the outlet cells 34. In the illustrated embodiment, the elements 36 disposed within the outlet cells 34 are implemented as webs of porous ceramic material. In this regard, the webs 36 extend transversely from the walls 38 and are configured and implemented to connect opposing midpoints of the walls 38 of the outlet cells 34. In this embodiment, the elements 36 extend into the cells from the walls, and extend completely across the outlet cells 34 in a cross-shaped configuration shown. These webs 36 form subcells within each cell 34 having less than about one quarter the area of the cell 34. The webs 36 described in this and the following embodiments are preferably formed during the extrusion process, and are made of the same material as the walls of the cells as will be explained in more detail below.

The thickness of the elements 36 may be the same, or different, from the thickness of the ceramic walls 38. As can be seen, in the embodiment of FIG. 5, the elements 36 are thicker than the ceramic walls 38. This allows significant increase in the bulk heat capacity of the filter 30 without appreciably impacting filtration performance thereof since the elements 36 do not impact the permeability of the ceramic walls 38. Correspondingly, the provision of the heat absorbing elements 36 effectively increases the bulk heat capacity of the filter 30 without substantially interfering with a flow of gas through the porous ceramic walls 38.

Figure 6:
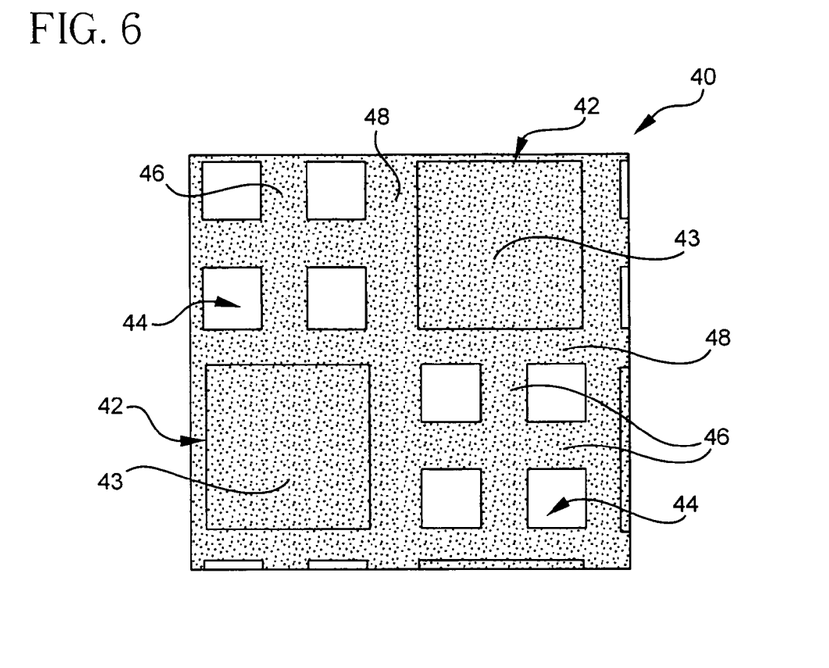
FIG. 6 is an outlet end partial view of a filter in accordance with still another embodiment in which the heat absorbing elements are provided as cross-shaped webs of porous ceramic material in the outlet cells.

FIG. 6 is an outlet end partial view of a ceramic wall-flow filter 40 in accordance with still another embodiment having a honeycomb structure including heat absorbing elements 46. The ceramic wall-flow filter 40 is similar to the filter described above relative to FIG. 5. However, the filter 40 is provided with heat absorbing elements 46 that are implemented as cross-shaped web of porous ceramic material that is integrally connected to the inner surface of the outlet cells 44. Inlet cells 42 are shown in FIG. 6 as being plugged by plugs 43. Preferably, no elements are disposed in any of the inlet cells. In addition, the heat absorbing elements 46 are implemented to have substantially the same transverse thickness as the thickness of the ceramic walls 48. Disposing the elements 46 only within the outlet cells 44 minimizes impact on inlet area needed for filtering and storing particulates. The webs form subcells within each outlet cell 44.

The significant advantages afforded by the present invention are most clearly seen by comparing the conventional honeycomb structure of filter 1 as shown in FIG. 1B, with the improved honeycomb structure of filter 40 as shown in FIG. 6. It can be seen that the ceramic walls 48 of filter 40 can be made much thinner than the ceramic walls 8 of the conventional filter 1 (0.011 inch versus 0.018 inch). This reduces the pressure drop of the exhaust gas that is passes through the filter 40 as compared to filter 1 thereby reducing back pressure that must be overcome by the engine. Of course, such thinner ceramic walls 46 would reduce the bulk heat capacity and increase filter temperatures during regeneration cycles. However, in accordance with the present invention, heat absorbing elements 46 are provided in the outlet cells that increase the bulk heat capacity so that such negative effects of thinner walls are avoided. Correspondingly, by providing such a heat absorbing elements 46, the bulk heat capacity of the filter 40 can be attained without substantially interfering with the flow of gas through the porous ceramic walls 48. Alternatively, for the same wall thickness, significantly better thermal shock properties for the filter may be obtained.

Figure 7:
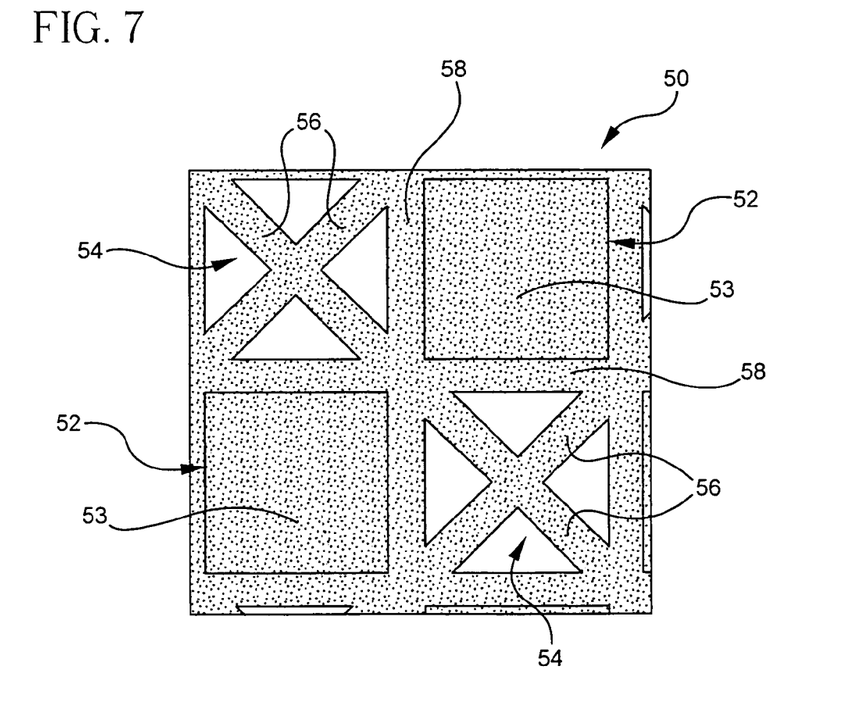
FIG. 7 is an outlet end partial view of a filter in accordance with yet another embodiment in which the heat absorbing elements are provided as X-shaped webs of porous ceramic material in the outlet cells.

FIG. 7 is an outlet end partial view of another embodiment of a ceramic wall-flow filter 50 of the present invention having heat absorbing, preferably gas conductive elements 56. The ceramic wall-flow filter 50 is substantially similar to the filter described above relative to FIG. 6 and includes inlet cells 52 and outlet cells 54 that are defined by ceramic walls 58. The inlet cells 52 are shown as being plugged by ceramic plugs 53. In contrast to the FIG. 6 embodiment, the filter 50 is provided with heat absorbing elements 56 that are implemented to integrally connect the opposing corners of the interior of the outlet cells 54 in an x-shaped configuration. The heat absorbing elements 56 are implemented as webs of porous ceramic material. Web elements 56 are preferably made of the same material and are preferably substantially the same thickness as the ceramic walls 58. Thus, by providing such a heat absorbing elements 56, higher bulk heat capacity of the filter 50 is attained without substantially interfering with the flow of gas through the porous ceramic walls 58 (as compared to a prior art filter without such elements).

The embodiment of the filter 50 as shown in FIG. 7 also provides additional advantages as well. Because the heat absorbing elements 56 are formed as continuous webs running along approximately 45° angles from the sides of the outlet cells, the filter 50 is more isotropic in mechanical properties as compared to conventional square cell honeycomb structures. In addition, the integral cross web implementation enhances the strength of the filter as compared to the conventional square cell honeycomb structures. Furthermore, due to the triangulation of the webs, the embodiment of the honeycomb structure shown in FIG. 7 is stronger than the honeycomb structure shown in FIG. 6 in which the webs are isolated in the middle of the outlet cells.

Figure 8:
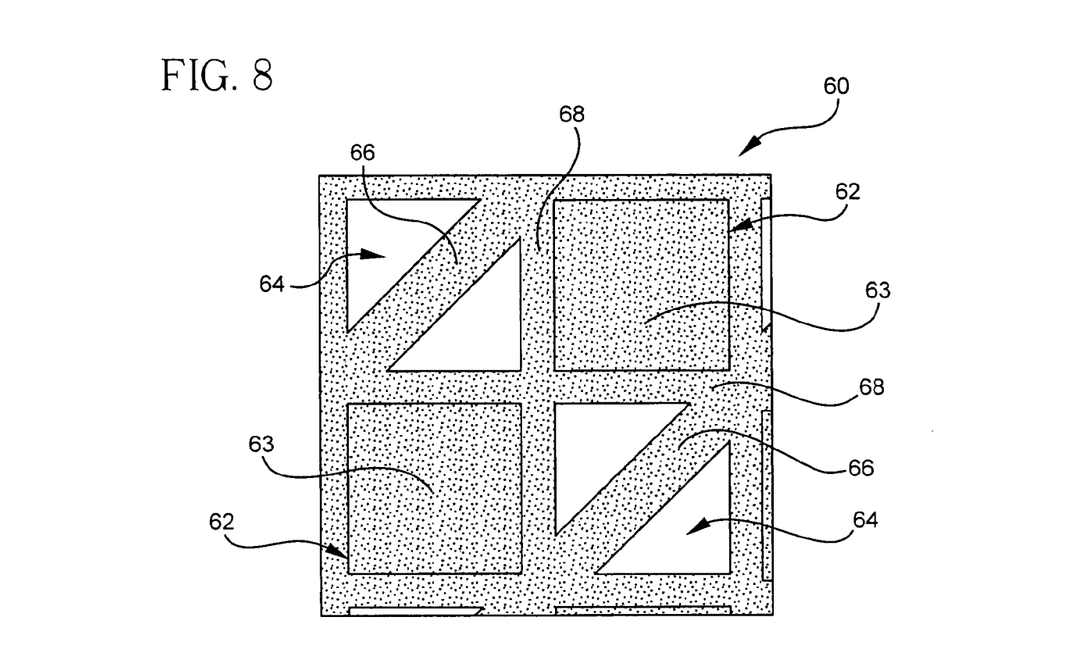
FIG. 8 is an outlet end partial view of a filter in accordance with still another embodiment where the heat absorbing elements are provided as diagonal webs of porous ceramic material in the outlet cells.

FIG. 8 is an outlet end partial view of a ceramic wall-flow filter 60 in accordance with still another embodiment having heat absorbing, preferably gas conductive elements 66. Like the other embodiments, the ceramic wall-flow filter 60 includes inlet cells 62 and outlet cells 64 defined by ceramic walls 68, with inlet cells 62 being plugged by ceramic plugs 63. The filter 60 is provided with heat absorbing elements 66, which in the present embodiment, are implemented to integrally connect the two opposing corners of the interior of the outlet cells 64 to provide a diagonal web of porous ceramic material that is thicker in transverse dimension than the thickness of the ceramic walls 68. Whereas the gas conductive elements are shown to be diagonal within the outlet cells 62 in one direction, other embodiments can be implemented to provide elements that are diagonal in alternating directions. Correspondingly, like the other embodiments, high bulk heat capacity is attained without substantially interfering with the flow of gas through the porous ceramic walls 68.

Figure 9:
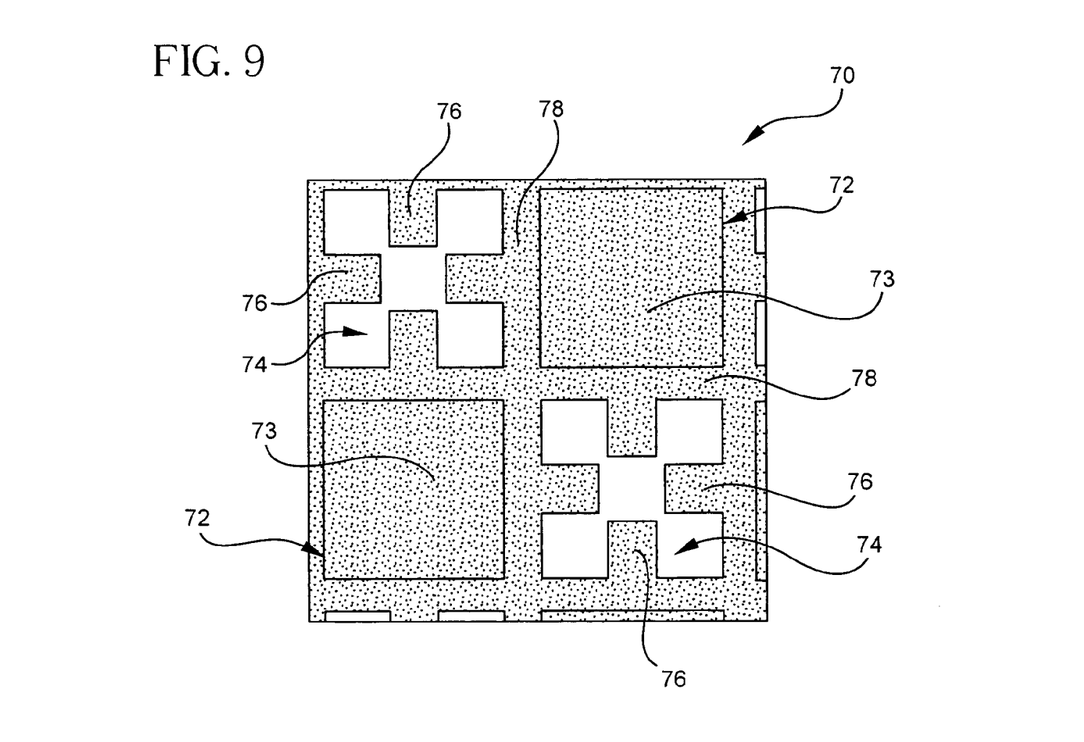
FIG. 9 is an outlet end partial view of a filter having a honeycomb structure in accordance with yet another embodiment in which the heat absorbing elements are provided as webs that extend partially into the outlet cells from the midpoints of the ceramic walls.

FIG. 9 shows an outlet end partial view of a ceramic wall-flow filter 70 in accordance with still another embodiment having heat absorbing, preferably gas conductive elements 76 implemented as webs that extend only partially into the outlet cells 74. The gas conductive elements 76 extend from and are integrally formed with the ceramic walls 78 of the flow filter 70 that define the inlet cells 72 and the outlet cells 74. Plugs 73 fill the ends of the inlet cells 72. The heat absorbing elements 76, in this embodiment, partially extend from the opposing midpoints of the ceramic walls 78 into the outlet cells 74 to thereby increase the bulk heat capacity without substantially interfering with the flow of gas through the porous ceramic walls 78. However, it should be recognized that the elements 76 may extend from any position or multiple positions along the walls 78. Another advantage of the filter 70 is that the heat absorbing elements 76 are preferably located only in the outlet cells 74, and therefore, do not occupy volume in the inlet cells 72 that is desirable for ash and soot storage.

Figure 10:
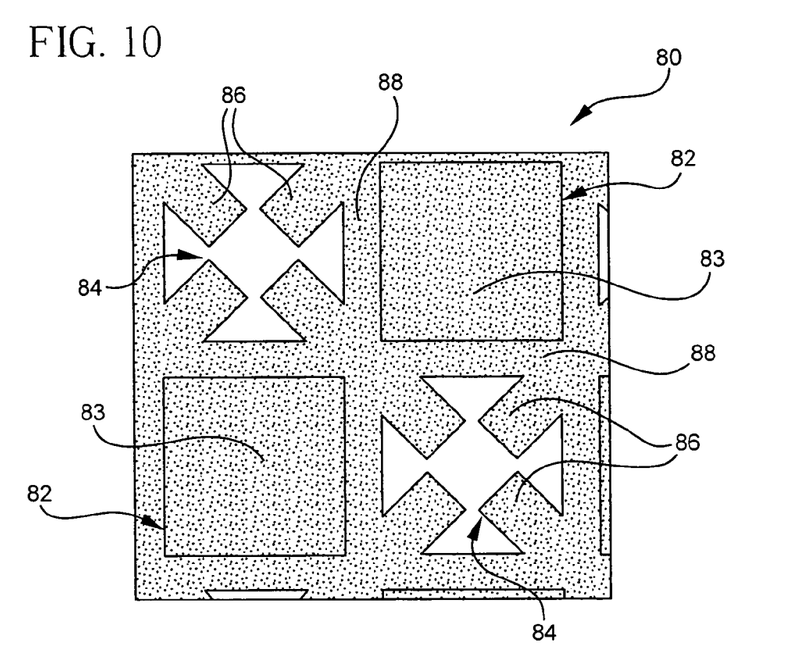
FIG. 10 is an outlet end partial view of a filter having a honeycomb structure in accordance with another embodiment in which the heat absorbing elements are provided as webs that extend partially into the outlet cells from the corners of the outlet cells.

FIG. 10 shows an outlet end partial view of a ceramic wall-flow filter 80 in accordance with still another embodiment that is similar to the filter shown in FIG. 9 discussed above. In this regard, the filter 80 has heat absorbing, preferably gas conductive elements 86 implemented as webs that extend only partially into the outlet cells 84. Like previous embodiments, plugs 83 fill the ends of the inlet cells 82. In contrast to the previous embodiments, the elements 86 are integrally formed at the opposing corners of the ceramic walls 88 that define the inlet cells 82 and the outlet cells 84. The heat absorbing elements 86 thus increase the bulk heat capacity without substantially interfering with the flow of gas through the porous ceramic walls 88. Another advantage of the filter 80 is that the heat absorbing elements 86 are located in the corners of the cells where less filtration occurs due to the increased distance the exhaust gas must travel. Correspondingly, this implementation minimizes impact on the regeneration intervals.

In all of the embodiments shown in FIGS. 5-10 above, the elements comprise one or more webs of material formed in the outlet cells. The webs are preferably of substantially constant thickness across the cell and preferably extend along the entire longitudinal length of the cell, and have preferably substantially constant thickness in the longitudinal direction also. Preferably, there is at least one element extending from and associated with each cell wall or extending into the cell from the junction of respective walls of the cell. Most preferably, the webs are formed in some or all of the outlet cells only and are not formed in the inlet cells. To the extent there are any web elements disposed in the inlet cells, they are provided to a lesser extent in comparison to the outlet cells such that the heat capacity of the outlet cells is greater than that of the inlet cells. It should also be recognized that the plugs are separate from the elements and do not comprise any portion of the elements, as defined herein.

TABLE 1 set forth below tabulates the dimensions for a conventional filter with a standard honeycomb structure as shown in FIG. 1B, and improved filters (designs 2. and 3.) having the honeycomb structure in accordance with the present invention as shown in FIG. 7. Row 1 sets forth the dimensions of a conventional filter having cell density of 200 cpsi (31 cells/cm$^2$) and wall thickness of 18.2 mil (462 μm).

Row 2 shows the dimensions of an embodiment of filter according to the invention having honeycomb structure of FIG. 7 with the heat absorbing elements, implemented to have the same cell density of 200 cpsi (31 cells/cm$^2$) and same bulk heat capacity as the conventional design of Row 1. As shown, the wall thickness is substantially decreased to 11 mil (279 μpm) by implementing the web elements of embodiment of FIG. 7 while maintaining the same 200 cpsi (31 cells/cm$^2$) cell density. Thus, it should be recognized that by employing the invention, the wall thickness may be reduced by 20% or more, or even as much as 30% or more without impacting the bulk heat capacity of the filter, as compared to the conventional design of the same cell density and bulk heat capacity. This reduction in wall thickness will result in decreased pressure drop across the filter which would decrease back pressure. The area of each inlet cell (Inlet Cell Area) is also increased from 0.0028 in$^2$ (0.018 cm$^2$) to 0.0036 in$^2$ (0.023 cm$^2$), i.e., over 20%, or even 25%. Similarly, the Geometric Surface Area (GSA) of the inlet cells is increased by more than 10%. Correspondingly, ash storage capacity and the filtration surface area are also increased relative to the conventional design.

Row 3 of TABLE 1 shows dimensions for another improved honeycomb structure as shown in FIG. 7 implemented to have the same inlet cell width and inlet cell area for each inlet cell as the conventional honeycomb structure design (Row 1), as well as the same bulk heat capacity. In this improved implementation, the cell density increases to 260 cpsi (40.3 cells/cm$^2$), i.e., over a 20% increase over the conventional design, and the wall thickness is further decreased to 9.5 mil (241 μm), i.e., over a 40% reduction as compared to the conventional design, so that the resultant pressure drop will decrease relative to the conventional design. Moreover, the Geometric Surface Area (GSA) of the inlet is increased by more than 20%, or even 25%. This increases the ash storage capacity and increases the filtration surface area relative to the conventional design.

TABLE 1

| Design | Cell Density (cpsi) | Wall Thickness (in) | Inlet Cell Width (in) | Area of four triangles (outlet) (in$^2$) | Inlet Cell Area (in$^2$) | % of open area on inlet face | OFA (1 − CFA) | Inlet GSA (in$^2$/in$^3$) | % increase in GSA from 200/19 std |
|---|---|---|---|---|---|---|---|---|---|
| 1. Std | 200 | 0.0182 | 0.053 |  | 0.0028 | 27.6 | 0.55 | 21.00 |  |
| 2. Tri | 200 | 0.011 | 0.060 | 0.0019 | 0.0036 | 35.7 | 0.55 | 23.88 | 13.7 |
| 3. Tri | 260 | 0.0095 | 0.053 | 0.0015 | 0.0028 | 35.9 | 0.56 | 27.31 | 30.0 |

Performance advantages of other embodiments of the filter in accordance with the present invention also discussed above can be expected as well. In view of the above, it should now be apparent to one of ordinary skill in the art how the present invention provides a ceramic wall-flow filter with comparatively thinner filtration walls so as to minimize the pressure drop, but at the same time, high bulk heat capacity (at least equal to conventional designs) to avoid high temperatures and potential damage during regeneration processes. It should be appreciated that whereas various preferred embodiments having specific configurations of the heat absorbing elements have been described in detail above relative to FIGS. 3-10, it should be noted that the present invention is not limited thereto. The heat absorbing elements may be configured in any appropriate manner in other implementations and embodiments of the present invention. Moreover, whereas the illustrated embodiments were discussed as being applied to filters with honeycomb structures with input and output cells that have square cross sections, it should be appreciated that the heat absorbing elements of the present invention may be similarly applied to filters with cells having different cross sections. For example, heat absorbing elements of the present invention may be utilized for filters that have cells having geometric shapes including rectangular, triangular, hexagonal, T-shaped, L-shaped, hourglass-shaped and circular-shaped cross sections, etc., for example.

The above described filters with honeycomb structures having integral heat absorbing elements of the present invention as best shown in FIGS. 6-10 may be manufactured in any appropriate manner. Manufacturing of filters with honeycomb structures are described in detail in U.S. Pat. Nos. 3,790,654; 4,420,316; 4,902,216; 5,487,863; and 6,696,132.

Figure 11:
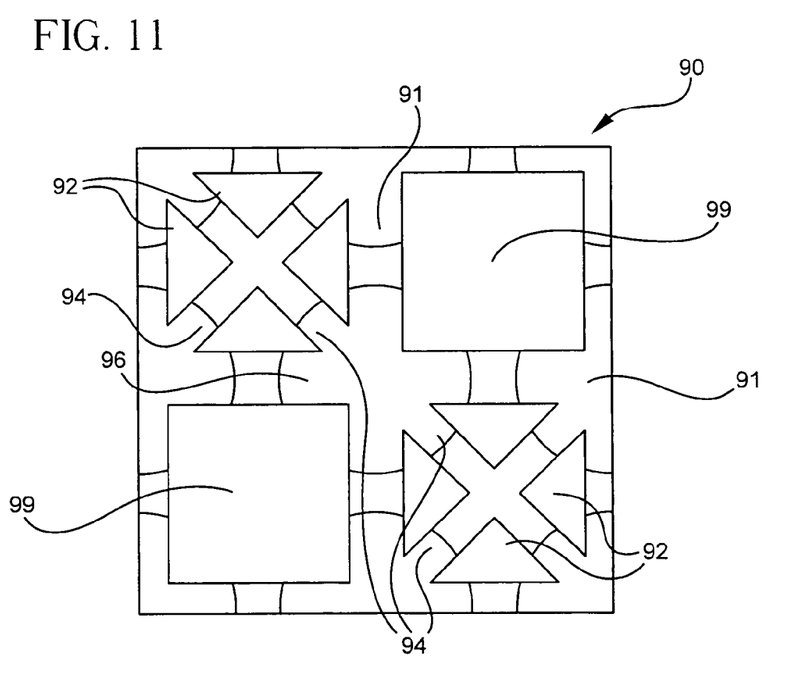
FIG. 11 is a schematic end view of a portion of a die for manufacturing the honeycomb structure of FIG. 7.
Figure 12A:
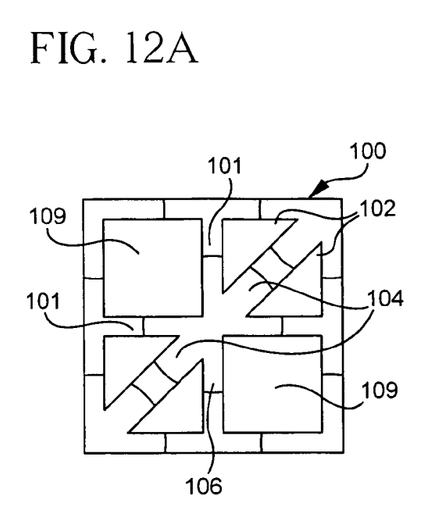
FIG. 12a and 12b are schematic end and side views, respectively, of a portion of a die for manufacturing the honeycomb structure of FIG. 8.
Figure 12B:
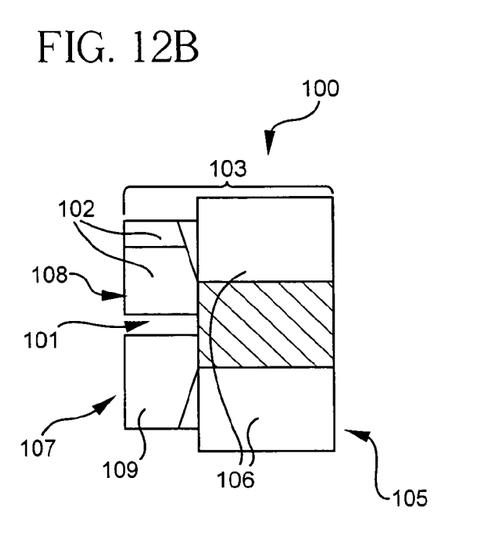
Figure 13:
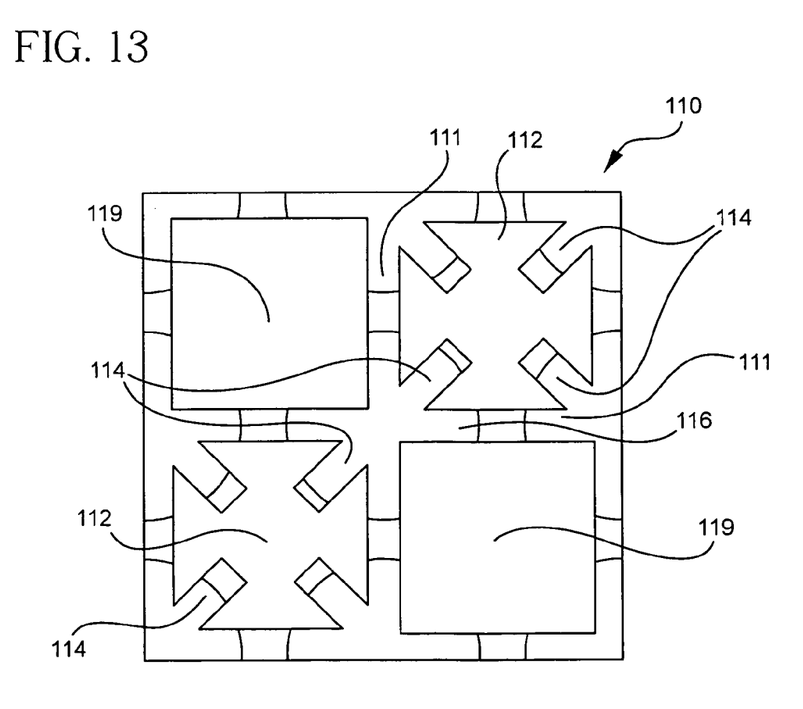
FIG. 13 is a schematic end view of a portion of a die for manufacturing the honeycomb structure of FIG. 10.

FIGS. 11 to 13 show example extrusion dies that may be used for manufacturing such honeycomb structures. The illustrated dies may be manufactured in a conventional manner with a series of feedholes in the entry side of the dies, and a series of discharge slots in the exit side of the die which intersect with the feedholes. As described in these incorporated references, the filter with honeycomb structures can be manufactured using an extrusion die with pin arrays as herein described.

FIG. 11 is a schematic end partial view of a portion of an extrusion die 90 that illustrates a pin array for manufacturing a filter 50 like that shown in FIG. 7 discussed above; both FIGS. being referred to herein. The pin array includes wall forming discharge slots 91 formed into the outlet end of the die that receive, from feed holes 96, the ceramic material used in forming the ceramic walls 58 of the filter 50 which intersect to define the inlet cells 52 and outlet cells 54. A plurality of triangular pins 92 are provided and are arranged and configured to form an outlet cell 54 with the heat absorbing elements 58 disposed therein. As shown, four triangular pins 92 are arranged together for forming the outlet cell 54 with the elements 58 as an x-shaped web. The four triangular pins 92 have first peripheral portion defined by discharge slots 91 and a second peripheral portion defined by non-wall forming slots 94 which intersect with and extend from the wall forming slots 91 in a transverse direction and intersect to form an x-shaped channel for receiving the ceramic material used to form the elements 56. The non-wall forming slots 94 are appropriately sized to correspond to the desired thickness of the heat absorbing elements 56 of the filter 50. The slots 91, 94 may be cut using wire EDM processes or other cutting or grinding processes. The extrusion die 90 also includes feed holes 96 (only one complete feed hole being shown). The feed holes 96 of the illustrated embodiment are positioned so that every intersection of the slots 91 and 94 are directly fed by holes to ensure proper distribution of the ceramic material through the die 90. It should be recognized that the pins 99 and pins 92 have different configurations as viewed from the outlet end of the die 90. In particular, pins 99 are adapted to form the inlet cells 52 and pins 92 form the outlet cells 54 and elements 56 of the ceramic wall flow filter 50.

FIGS. 12*a* and 12*b* are schematic partial end and side views, respectively, of a representative portion of an extrusion die 100 that illustrates a pin array for manufacturing a filter 60 like that disclosed in FIG. 8 discussed above; FIGS. 8, 12*a*, and 12*b* being referred to herein. The pin array includes a die body 103 having intersecting wall forming discharge slots 101 formed in the die face 108 of the outlet end 107. Discharge slots 101 receive the ceramic material and form the intersecting ceramic walls 68 of the filter 60 thereby defining the inlet cells 62 and outlet cells 64. A pair of triangular pins 102 are arranged to form an outlet cell 64 with the heat absorbing element 66 that extends from the walls and is positioned diagonally therein. Directly adjacent pins 109 are arranged to form inlet cell 62. As shown, the two triangular pins 102 have a first peripheral portion defined by the discharge slots 101 and a second peripheral portion defined by non-wall forming slot 104 which extends from, and also intersects, the discharge slots 101; slot 104 being sized to provide a desired thickness of the heat absorbing element 66 which is shown as being thicker than that of the cell walls 68. The slots 101, 104 may be cut as described above in the previous example. Feed holes 106 (only full one shown) are formed into inlet end 105 and are positioned so that every intersection of the slots 101 and 104 is directly fed to ensure proper distribution of the ceramic material through the die 100. It should be recognized that pins 109 have a different configuration than pins 102, pins 109 being square in cross section and pins 102 being both triangular and having a smaller area than pins 109. Pins 109 are adapted to form the inlet cells 62 whereas pins 102 are adapted to form the outlet cells 64 having elements 66 disposed therein. Side view constructions of the other die embodiments described herein, other than having different non-wall forming slots or notches, is otherwise the same as this embodiment and will not be repeated herein for brevity.

FIG. 13 is a schematic end partial view of a portion of an extrusion die 110 that illustrates a pin array for manufacturing a filter 80 like that of FIG. 10 discussed above. The pin array includes wall forming discharge slots 111 that receive the ceramic material which forms the ceramic walls 88 of the filter 80 to define the inlet cells 82 and outlet cells 84. In pins 112, a plurality of non-wall forming notches 114 are arranged to form outlet cells 84 with the heat absorbing elements 86 that partially extend into the outlet cells 84 from the corners of the ceramic walls 88. Die 110 may be made using plunge EDM machining processes. Feed holes 116 (only full one shown) are positioned so that every intersection of the slots 111 and notches 114 are directly fed to ensure proper distribution of the ceramic material through the die 110. The configuration of pins 112 includes a first peripheral portion defined by the wall forming discharge slots 111 and a second peripheral portion defined by notches 114. Pins 119 have a square configuration with a periphery formed by the wall forming slots 111.

Figure 14:
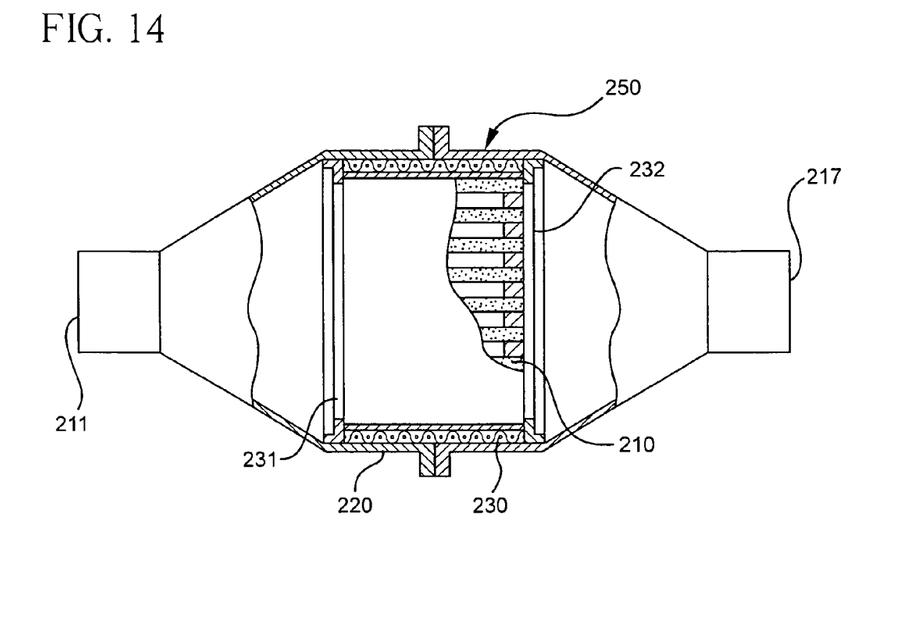
FIG. 14 is a partially cross-sectioned side view of diesel particulate filter containing the wall-flow filter according to the invention.
Figure 15:
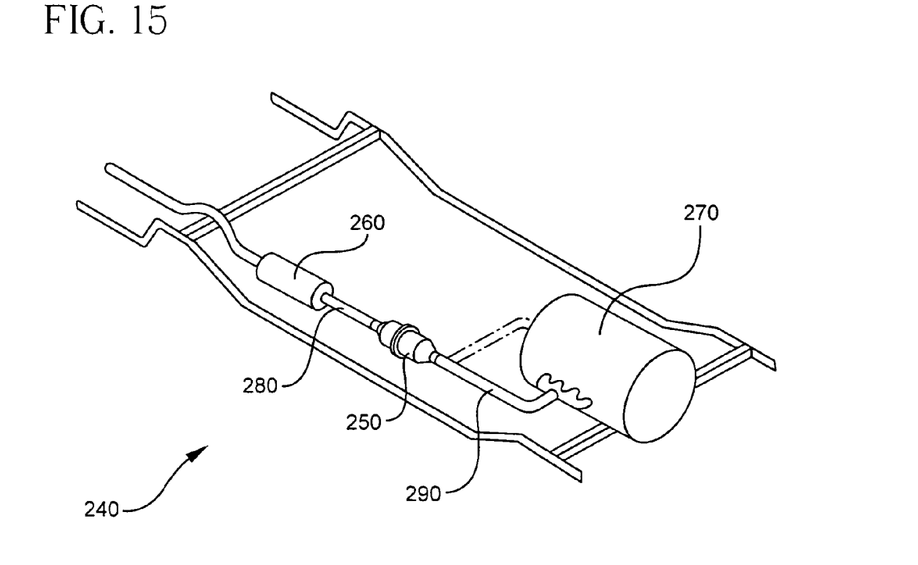
FIG. 15 is an isometric view of an exhaust system of a vehicle including the diesel particulate filter of FIG. 14 according to further aspects of the invention.

As best shown in FIG. 14, the ceramic wall-flow filter 210 according to any of the previously described embodiments of the invention is preferably included in a diesel particulate filter 250 (although an embodiment like that of FIG. 3 is shown having a ceramic material filling the outlet cells). The filter 210 is mounted within a housing 220 having an inlet end 211 and an outlet end 217. The filter 210 is preferably canned within the housing 220 and is surrounded and spaced from the housing by a surrounding mat 230 of a refractory fiber, metal mesh or other like high-temperature, compliant material. The mat 230 secures the filter 210 in place and allows for some relative expansion. Members 231, 232 preferably abut the filter 210 and position it longitudinally. The diesel particulate filter 250 is preferably included in an exhaust system 240 of a vehicle as shown in FIG. 15 (only a portion of the vehicle shown for clarity). The diesel particulate filter 250 is preferably mounted between the muffler 260 and the engine 270 and is fluidly connected to the engine by one or more pipes 290, and preferably also to a muffler 260 by pipe 280.

Figure 16:
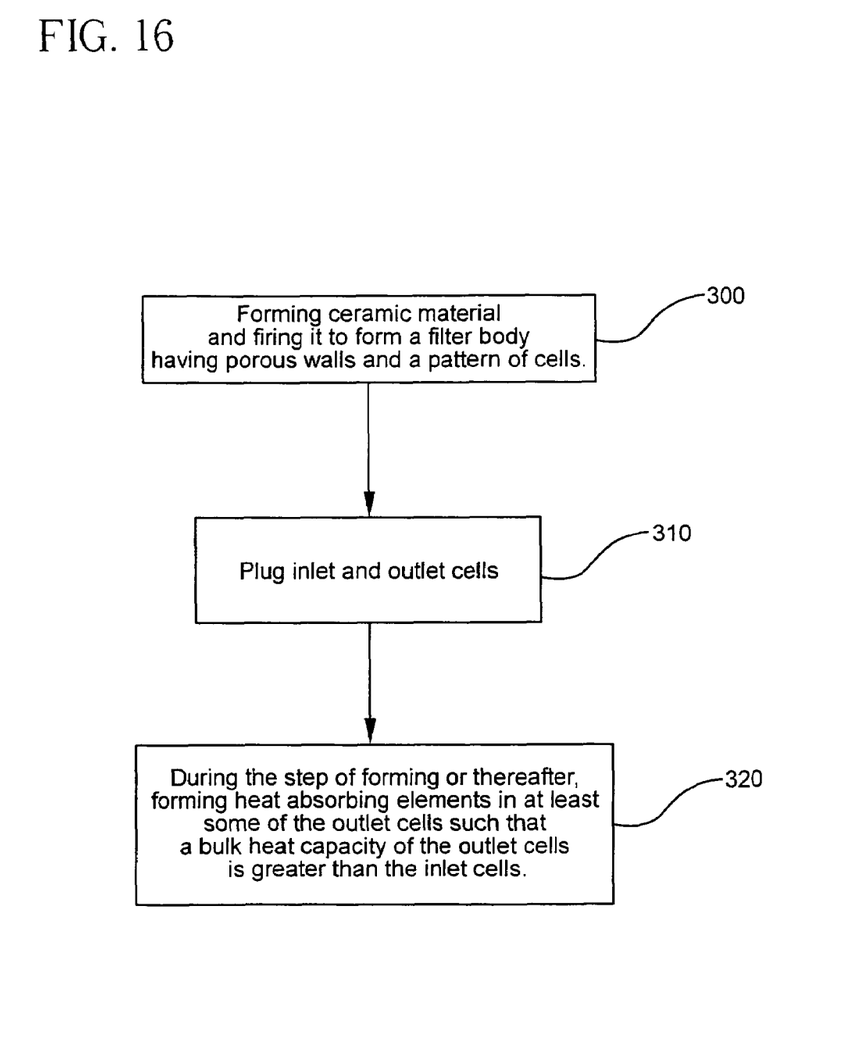
FIG. 16 is a flow chart illustrating the manufacturing process for forming the ceramic wall-flow filter according to further aspects of the invention.

In accordance with another aspect, the invention is a method of manufacturing a ceramic wall-flow filter as shown in FIG. 16. The method comprises the steps as follows. The first step comprises extruding a ceramic batch material through a die to form a green body. The green body is optionally dried and fired to form a filter body as shown in block 300. The fired filter body has an array of porous ceramic walls defining a pattern of inlet and outlet cells which traverse the body as shown in the various figures (see, for example, FIG. 3). The cells are oriented to preferably extend between the inlet end and the outlet end. Next, each of the respective inlet and outlet cells are plugged with a thin-walled plug at their respective ends as shown in block 310 and in FIGS. 3-10. The inlet cells are plugged with first plugs at the outlet end. Similarly, the outlet cells are blocked with second plugs at the inlet ends. Plugging may be accomplished by the methods taught in U.S. Pat. Nos. 4,411,856; 4,557,773; and 4,752,516, for example. Additionally, during the step of extruding or thereafter, heat absorbing elements are formed within at least some of the outlet cells.

The heat absorbing elements may be formed in at least some of the outlet cells as shown in block 320. Most preferably, the elements are only disposed in at least some of the outlet cells, and not in any of the inlet cells. This ensures that the heat capacity of the outlet cells is greater than the inlet cells. In the embodiments where the elements are webs, they are preferably formed during the extrusion process and are preferably formed of the same material as the cell walls. In the embodiment where the elements comprise a ceramic foam material which either provides a layer on the cell walls or fills some or all of the outlet cells, such may be formed by any suitable coating or dipping process, by injection, spraying, or pouring, etc. Further, the step of forming the elements may include filling at least some of the outlet cells with loose heat absorbing material which is not unattached to any portion of the porous walls. Suitable materials such as ceramics, glasses, metals or/or carbide materials may be employed. Suc materials may be in powder, particulate, fibrous, and/or solid or porous form (such as one or more solid or porous rods or balls). In particular, the fill material should have higher specific heat than the walls and are preferably situated and arranged in the cell to provide sufficient open interconnected porosity such that the back pressure penalty is very small. In such cases, an additional plug 19 may be needed to retain the material within the outlet cell, such as shown in FIG. 3. Such plugs 19 are preferably more porous than the plugs 13, 15. Although it is preferred that the heat absorbing elements are disposed only on the outlet cells, some heat absorbing elements mat be provided in at least some of the inlet cells, but only to the extent that the bulk heat capacity of the outlet cells remains greater than that of the inlet cells.

While various embodiments in accordance with the present invention have been shown and described, it is understood that the invention is not limited thereto. The present invention may be changed, modified, and further applied by those of ordinary skill in the art. Therefore, this invention is not limited to the detail shown and described previously, but also includes all such changes and modifications.

We claim:

1. A ceramic wall-flow filter, comprising:
   a filter body having an array of porous ceramic walls defining a pattern of inlet and outlet cells traversing the body and extending between an inlet end and an outlet end, the inlet cells including first plugs at the outlet end, and the outlet cells including second plugs at the inlet end, and
   heat absorbing elements disposed within at least some of the outlet cells such that a bulk heat capacity of the elements in the outlet cells is greater than a bulk heat capacity of elements in the inlet cells, if any;
   wherein said heat absorbing elements comprise a porous ceramic foam material.

2. The ceramic wall-flow filter of claim 1 wherein said porous ceramic foam material is a coating applied on inner surfaces of the at least some of the outlet cells.

3. The ceramic wall-flow filter of claim 1 wherein the porous ceramic foam material consists of a non-active material.

4. The ceramic wall-flow filter of claim 1 wherein said ceramic foam material is provided in at least some of said outlet cells only, and not in any of the inlet cells.

5. The ceramic wall-flow filter of claim 1 wherein said ceramic foam material substantially entirely fills at least some of the outlet cells.

6. The ceramic wall-flow filter of claim 1 wherein the permeability of said ceramic foam material is higher than the permeability of the ceramic material forming the porous ceramic walls.

7. A diesel particulate exhaust filter, comprising: a housing, and the ceramic wall-flow filter of claim 1 contained within the housing.

8. A diesel exhaust system, comprising:
   a diesel particulate exhaust filter including a housing and the ceramic wall-flow filter of claim 1 contained within the housing,
   an engine, and
   piping fluidly interconnecting the diesel particulate exhaust filter and the engine.

9. The ceramic wall-flow filter of claim 1 wherein a material, mass, and configuration of the elements are selected to provide an increase in a bulk heat capacity of the filter without substantially interfering with a flow of gas through said porous ceramic walls, as compared with a like constructed filter without said elements.

10. A method of manufacturing a ceramic wall-flow filter, comprising the steps of:
    forming ceramic material into a filter body having an array of porous ceramic walls defining a pattern of inlet and outlet cells traversing the body and extending between an inlet end and an outlet end,
    plugging the inlet cells with first plugs at the outlet end,
    plugging the outlet cells with second plugs at the inlet end, and
    during the step of forming or thereafter, forming heat absorbing elements within at least some of said outlet cells such that a bulk heat capacity of the outlet cells is greater than a bulk heat capacity of the inlet cells;
    wherein the heat absorbing elements are comprised of a material selected from the group consisting of ceramics, glasses, metals, carbide materials, and combinations thereof.

11. A ceramic wall-flow filter, comprising:
    a filter body having an array of porous ceramic walls defining a pattern of inlet and outlet cells traversing the body and extending between an inlet end and an outlet end, the inlet cells including first plugs at the outlet end, and the outlet cells including second plugs at the inlet end, and
    heat absorbing elements disposed within at least some of the outlet cells such that a bulk heat capacity of the elements in the outlet cells is greater than a bulk heat capacity of elements in the inlet cells, if any;
    wherein the elements comprise loose material and are not attached to any portion of the porous ceramic walls, wherein the loose material is selected from the group consisting of ceramics, glasses, metals, carbide materials, and combinations thereof.

12. A ceramic wall-flow filter, comprising:
    a filter body having an array of porous ceramic walls defining a pattern of inlet and outlet cells traversing the body and extending between an inlet end and an outlet end, the inlet cells including first plugs at the outlet end, and the outlet cells including second plugs at the inlet end, and
    heat absorbing elements disposed within at least some of the outlet cells such that a bulk heat capacity of the elements in the outlet cells is greater than a bulk heat capacity of elements in the inlet cells, if any;
    wherein said elements comprise webs of porous ceramic material extending into at least some of the outlet cells.

13. The ceramic wall-flow filter of claim 12 wherein said webs extend completely radially across said outlet cells thereby dividing the outlet cell into outlet subcells.

14. The ceramic wall-flow filter of claim 12 wherein an interior of said outlet cells has a generally square radial cross section, and at least some of said webs are connected across two corners of said interior in a diagonal configuration.

15. The ceramic wall-flow filter of claim 12 wherein two of said webs are connected across different opposing corners of said interior in an x-shaped configuration.

16. The ceramic wall-flow filter of claim 12 wherein the thickness of said webs is different from the thickness of the porous ceramic walls.

17. The ceramic wall-flow filter of claim 12 wherein said outlet cells have a square cross section, and wherein the webs are connected to, and extend from opposing midpoints of said porous ceramic walls.

18. The ceramic wall-flow filter of claim 12 wherein said webs are disposed in the outlet cells only.

* * * * *